June 4, 1957     P. LAGRANGE     2,794,343

PUNCTURE-WARNING DEVICE

Filed July 8, 1955

Inventor
Pierre Lagrange,

By Karl W. Flocks
Attorney

ର2,794,343
Patented June 4, 1957

2,794,343

PUNCTURE-WARNING DEVICE

Pierre Lagrange, Abbeville, France

Application July 8, 1955, Serial No. 520,843

Claims priority, application France July 28, 1954

2 Claims. (Cl. 73—390)

The present invention relates to a puncture-warning device which can be mounted on the wheels of automobile vehicles, and in particular of heavy lorries, light vans and touring cars, so as to give an immediate warning to the driver of any puncture occurring in one of the pneumatic tires of his vehicle.

United States Patent No. 2,705,471 dated April 5, 1955, discloses a warning device comprising a tubular body mounted on the end of the tire valve, in which is arranged a second valve which is constantly forced towards its open position by a calibrated spring and which is maintained on its seating by the pressure which obtains within the interior of the inner tube of the tire, by means of which the second valve lifts away from its seating when the pressure within the interior of the inner tube falls as a result of a puncture and enables the air thus liberated to act on a sound warning device, such as a whistle, communicating with the tubular body on the open side of the said second valve.

The object of the present invention is an improvement on the aforesaid device and relates in particular to the air circuit leading to the sound-warning device at the moment when a puncture occurs.

According to this improvement, the second valve is replaced by a piston urged, as the aforesaid valve, by a loaded spring.

The said piston occupies a position which is variable in accordance with the pressure prevailing in the air chamber, and when the piston occupies a position which corresponds to a puncture in the said air chamber, it uncovers in the body of the apparatus at least one port through which the air coming from the air chamber can pass and thence enter the warning whistle.

A further object of the present invention is to give a permanent indication of the pressure prevailing inside the air chamber, by means of an index secured to the piston rod and movable opposite a graduated scale.

Other features and advantages of the present invention will become clear from the description thereof which is given below with reference to the accompanying drawing which shows diagrammatically and merely by way of example, without any intention to restrict the invention, one form of embodiment of the piston-operated puncture warning device in accordance with the present invention.

Figure 1:
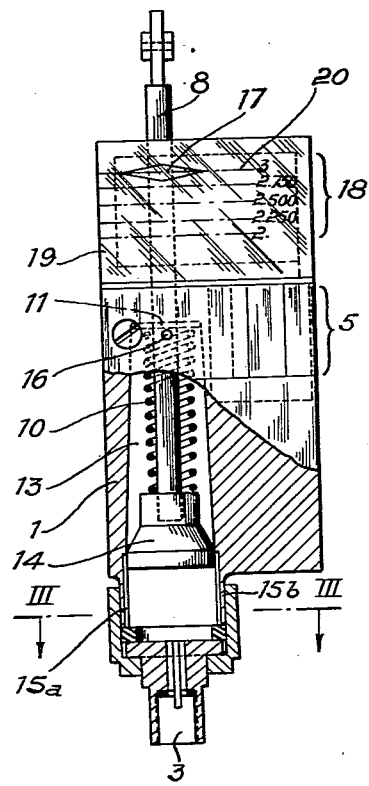
Figure 2:
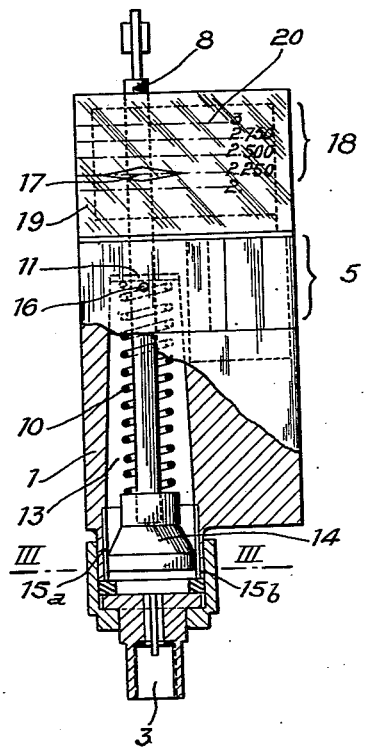
Figure 3:
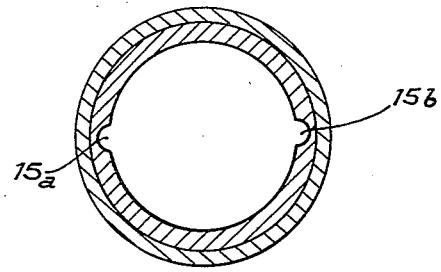

In said drawings, Figures 1 and 2 illustrate the puncture-warning device as a whole, partly in section, the piston being respectively in its closed and open position. Figure 3 is a section along the line III—III of Figures 1 and 2.

The apparatus shown in Figures 1 and 2 essentially comprises a body 1 exhibiting a partly cylindrical and partly conical recess 13, in which can move a piston 14 secured to the rod 8. A spring 10 which bears respectively on a washer 11 and on the piston 14 constantly urges the piston towards the open position. The puncture-warning device is connected to the tire valve (not shown) through the communication channel 3. Two ports 15a and 15b each in the form of a groove extending longitudinally of the wall of the body 1 are provided for the passage of the air from the air chamber into the recess 13 and, thence, into an opening 16 of the whistle which is generally shown at 5.

Finally, the end of the rod 8 carries an index 17 adapted to move opposite a graduated scale 18 and enclosed in a transparent housing 19, for example, of a transparent plastic material.

The apparatus which has just been described operates as follows:

The tension of the spring 10 being adjusted to such a value that if the piston 14 is subjected to the pressure of the fully-inflated tire or to a pressure slightly less, said pressure is just able to overcome the tension of said spring, and the apparatus being connected to the tire valve so that the channel 3 is put in communication with the inside of the air chamber, the piston 14 occupies the position shown in Figure 1, corresponding to maximum pressure, and closes the ports 15a and 15b, thus preventing the passage of the air towards the recess 13 and towards the whistle 5. The index 17 is then opposite the line 20 of the scale 18 corresponding to maximum pressure in the air chamber.

In case the pressure in the air chamber decreases slightly, the piston 14 moves under the action of the spring 10 and the rod 8 carries in its displacement the index 17 which moves along the scale 18 on which may be read the successive decreasing pressures.

Finally, if a puncture or blow-out occurs, the substantial drop of pressure brings the piston 14 into the position shown in Figure 2, in which it uncovers the ports 15a and 15b. The air coming from the air chamber through the channel 3 can then flow through ports 15a and 15b and thence into the recess 13, through the aperture 16 and finally reach the whistle 5 which then operates.

It is to be understood that the present invention has only been described in a purely explanatory and nowise restrictive manner and that alterations of detail can be made therein without departing from its spirit. In particular, the puncture-warning device can be mounted otherwise than on the tire-valve, provided it is in communication with the tire air-chamber.

I claim:

1. A deflation-warning device for indicating punctures and over-deflation in a pneumatic tire, comprising a casing having a recess therein, an inlet to one end of said recess adapted for connection with the air chamber of a pneumatic tire, a sound-warning device located at the other end of said recess, a piston slidable within at least a portion of said recess, a loaded spring engaging said piston and urging said piston against the air pressure prevailing at said inlet, at least one passageway in the side wall of said recess adjacent to said inlet end, said piston being adapted to cover said recess and said passageway in its position when the tire is sufficiently inflated, and to uncover said passageway when the tire is deflated whereby air from the tire passes through said passageway around said piston to said sound-warning device.

2. A deflation-warning device according to claim 1, wherein the piston is provided with a piston rod to which is secured a piston positioning-indicating device, a graduated scale on said casing adjacent said piston positioning-indicating device whereby the pressure prevailing inside said tire is continuously indicated and can be read when said sound-warning device is actuated.

References Cited in the file of this patent

UNITED STATES PATENTS

| 960,246 | Ashmore | June 7, 1910 |
| 2,579,120 | Mercer | Dec. 18, 1951 |
| 2,721,572 | MacDonald | Oct. 25, 1955 |

FOREIGN PATENTS

| 794,934 | France | June 4, 1935 |